Patented Oct. 8, 1935

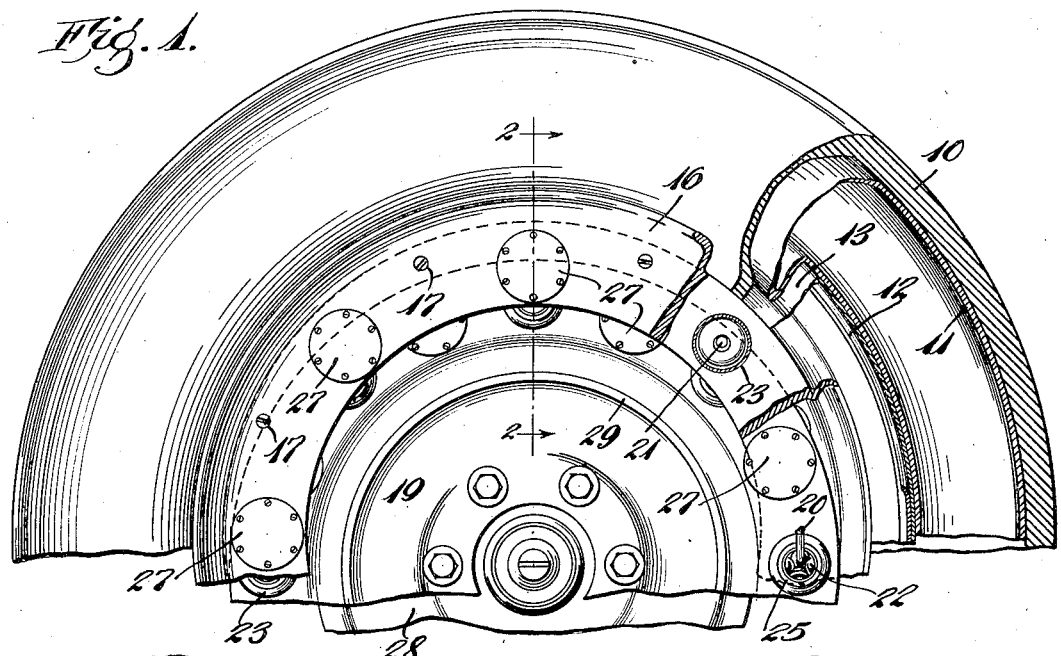
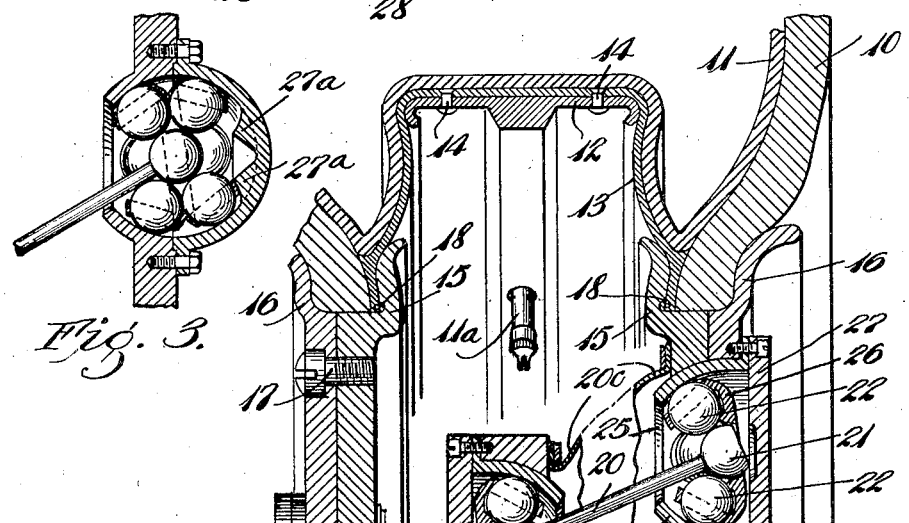
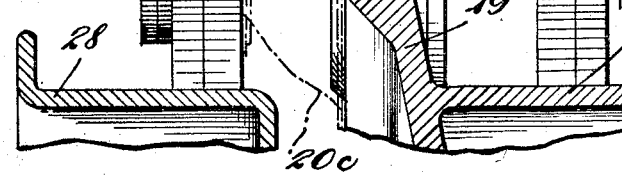

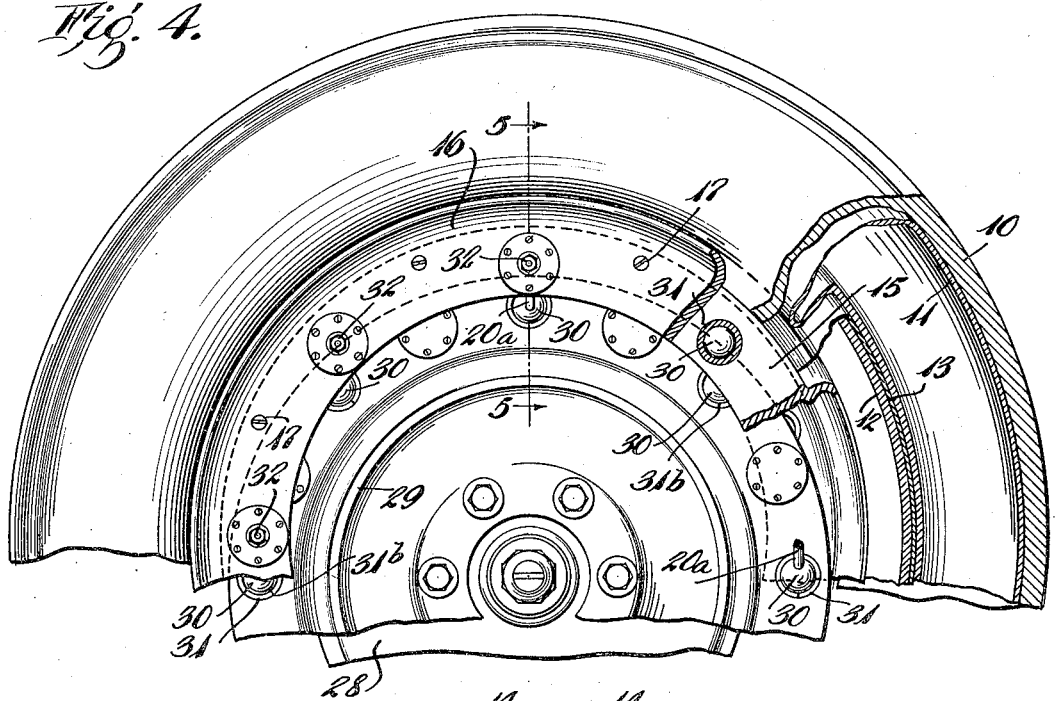

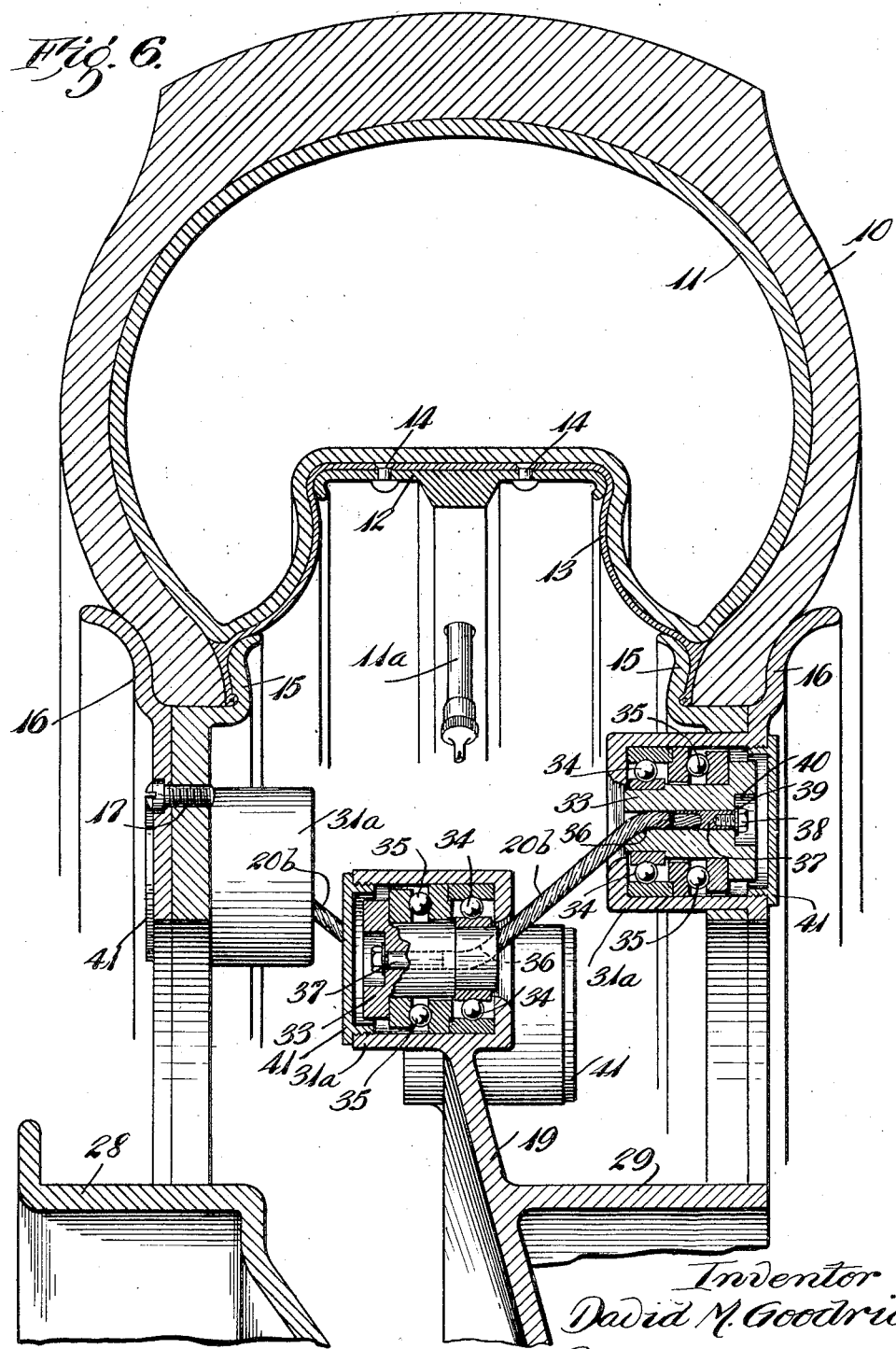

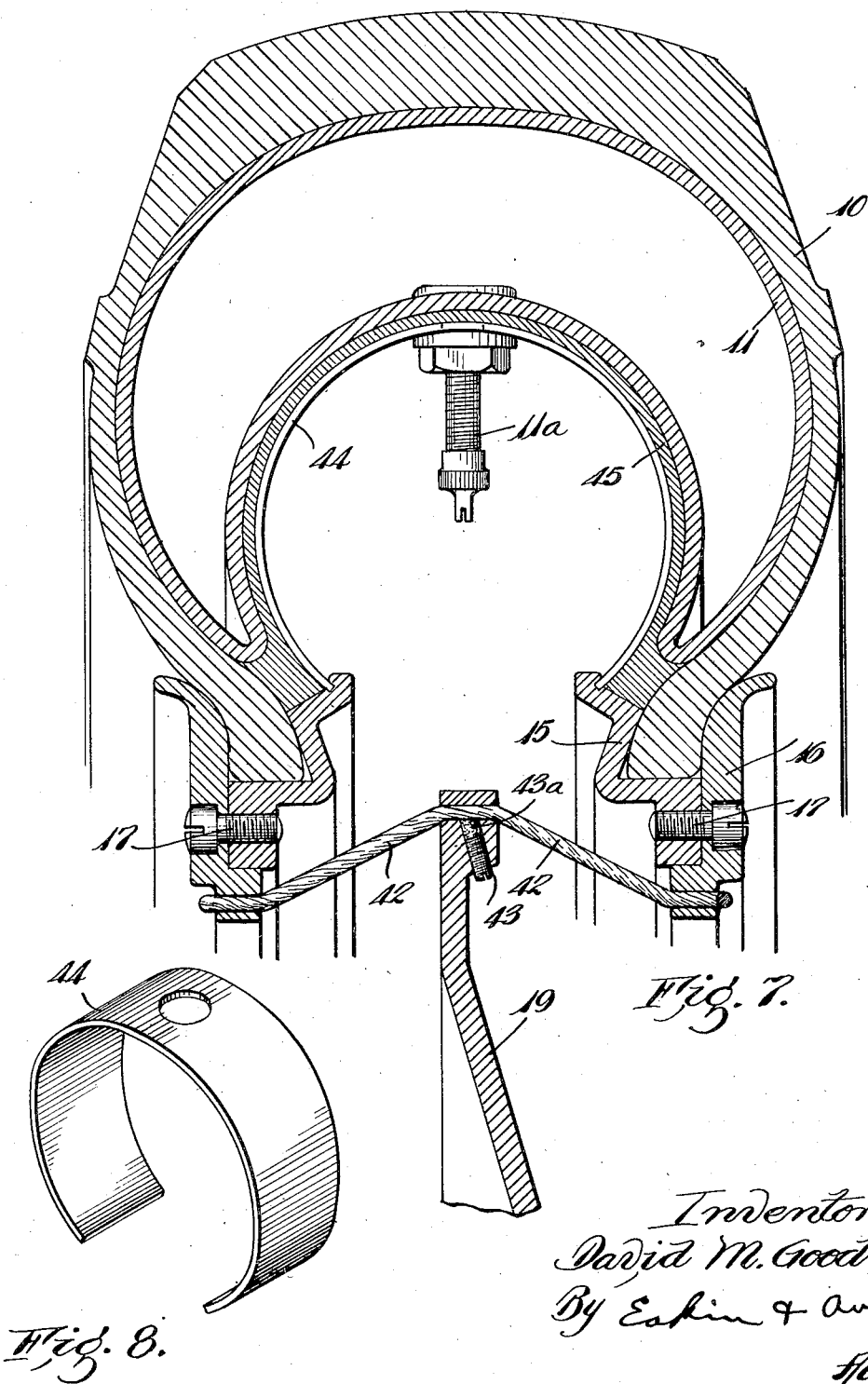

2,016,776

UNITED STATES PATENT OFFICE 2,016,776

WHEEL AND TIRE ASSEMBLY

David M. Goodrich, Mount Kisco, N. Y.

Application July 8, 1933, Serial No. 679,527

13 Claims. (Cl. 152—28)

This invention relates to cushioning structures and elements of the same and especially to cushioning structures adapted for incorporation in wheel assemblies for automobiles or other vehicles.

Its chief objects are to provide a highly effective cushioning structure, to provide easy riding in a vehicle supported by such a structure, to provide an improved cushioning structure without excessive cost of manufacture, and to provide long life for the structure and for the vehicle or other mechanism which is supported or cushioned by it.

A more specific object is to provide an improvement upon the cushioning device which is shown as applied to a wheel assembly and is claimed in my U. S. Patent No. 1,601,825.

Other specific objects are conveniently to provide a long-range or low modulus cushioning structure to provide a vehicle having a very small amount of unsprung weight, to supplement locally the usual cushioning effect of a pneumatic or other resilient tire, and to provide improved hinge-link assemblies and improved universal hinge-joint constructions adapted for advantageous use in cushioning structures and in other devices.

Other and more specific objects will be made manifest in the following description.

Of the accompanying drawings:

Fig. 1 is a fragmentary side-elevation, with parts sectioned and broken away, of a wheel assembly embodying my invention in its preferred form.

Fig. 2 is a cross-section of the same on line 2—2 of Fig. 1.

Fig. 3 is a sectional view of a modified type of universal hinge-joint.

Fig. 4 is a fragmentary side-elevation of a wheel assembly embodying my invention in a modified form.

Fig. 5 is a cross section of the same on line 5—5 of Fig. 4.

Fig. 6 is a cross-section of an assembly illustrating another modification of the invention.

Fig. 7 is a similar view illustrating still another modification.

Fig. 8 is a perspective view of a resilient arch-element employed in the embodiment of Fig. 7.

Referring first to Figs. 1 and 2, this embodiment of the invention comprises a pneumatic tire-casing 10, which may be of the usual construction, and an inner tube 11, which may be of the usual form but preferably is molded to the cross-sectional shape shown in Fig. 2, for ease of mounting and for avoidance of any excessive tension in any part of the wall of the tube when it is in service.

For holding the inner tube to what may be roughly termed a crescent or a pantaloon or a U shape in cross-section, a "floating" metal ring 12 of larger diameter than the bead diameter of the tire casing 10 is mounted within the casing and is adapted to hold the middle portion of the radially-inner wall of the inner tube outward, thus maintaining the U shape of the casing and tube assembly, and the ring 12 has as its only immediate support an endless rubberized cord fabric apron 13 of which the middle portion rests upon the outer face of the metal ring 12 and is secured accurately in place thereon by rivets such as the rivets 14, 14, and each side margin of the apron is clamped, along with the adjacent bead portion of the tire casing, between an inner rim or side-ring member 15 and an outer rim or side-ring member 16, the said side-ring members of each pair being drawn and held together by screws such as the screws 17, 17.

Preferably the apron 13 is provided at each of its side margins with a flexible-core rib or bead 18 adapted to fit in a complementary groove formed in the adjacent inner side ring 15, for secure anchorage of the margin of the apron, and the cords of the cord-fabric apron preferably are disposed radially, as in that position they are best adapted, with economy of material, to withstand the pressure of the air within the tire, and as the apron is not subjected to any other substantial strains except such as are incident to the inertia or momentum of the floating ring 12 and adjacent portions of the apron and inner tube.

The floating ring 12 may be endless if it is of sufficiently small diameter to be mounted in that form in the assembly, as it may be if only a moderately low modulus of elasticity is desired in the assembly, and if an extremely low modulus is desired the ring may be of larger diameter and may be of spring construction and transversely split or may be made as a plurality of attachable and detachable segments to permit it to be mounted in and removed from the assembly.

The floating ring is apertured as shown to accommodate the valve stem 11a of the inner tube.

A wheel body is shown at 19 and to provide connections from the side-rings to the wheel body such as to provide a hammock-like support for the wheel body a circumferential series of hinge-links such as the hinge-links 20, 20 are provided, those illustrated in the embodiment of Figs. 1 and 2 being of metal and each being provided at each end with a ball-end portion 21.

The ball-end portion of the link at the outer or side-ring end of the link has bearing contact with a set of bearing balls such as the balls 22, 22 which bear against the spherical inner face of a socket or universal ball-race member 23 which is fitted in an aperture formed in the side-ring structure and formed with a shoulder 24 seating against the outer face of the side-ring member 16. The socket member is formed with an end opening 25 to permit a gyratory swinging of the link 20 from the focal center of the ball-end 21, coincident with the focal center of the socket 23, with adequate amplitude of circular swinging movement in the rotation of the wheel assembly, the series of focal centers at the felly or wheel member and those at the side rings being spaced apart on circles of equal diameter so that when there is no load upon the assembly the hinge-links will be parallel with the axis of the wheel and will depart from such positions, in a cushioning movement, when a load is applied to the assembly, the side rings being drawn toward each other by the hinge-links, against the yielding force of the air pressure, while continuing to be parallel to each other. The shape of the air cavity is such that a long range of movement with but slight increase of resistance is obtained, as in the case of a Bourdon tube, this being desirable from the standpoint of effective cushioning.

For convenience and economy and for simplicity of calculation the bearing balls 22 may be of the same radius as the ball end 21, as shown, but I do not wholly limit my claims to that characteristic, as the relative sizes of the bearing balls and of the ball end may be varied according to considerations of bearing strength as determined by the number and size of bearing balls employed and considerations of the amplitude of cushioning movement considered necessary or desirable in the assembly, the size of the opening 25, the diameter of the link 20 and the width of the annular bearing surface of the socket member 23 being factors in the determination of the maximum amplitude of the cushioning movement of the wheel body 19 with relation to the side rings. The travel of the bearing balls transversely of their race is less in degrees than that of the link, but it has a definite relation thereto and to the relative sizes of the bearing balls and the ball-end of the link.

Preferably each set of the bearing balls 22, 22 is provided with a suitable cage 26 adapted to keep the balls in proper relationship and a cover plate 27 is mounted as a closure upon the outer end of the socket member 23 to retain grease therein and to serve as a stop for the cage 26, to provide an automatic positioning of the balls at the end of an extreme cushioning movement of the link 20 if the balls have departed in any substantial degree from their proper angular relationship to the other members of the assembly.

Similar universal hinge-joint connection is provided between the inner end of each link 20 and the wheel member or felly 19, and the links on each side of the assembly preferably are staggered with relation to those on the other side, so that widely spaced focal centers of the pair of socket members and links of correspondingly great effective length may be employed, with a consequently long range of cushioning movement of the wheel member 19 for a given movement of the side ring structures toward each other, which is of substantial importance in obtaining highly effective cushioning.

It is desirable that the air pressure and the proportions of the parts be such in relation to the load to be carried as to permit the links normally to operate at positions not so far from the horizontal as to counteract or nullify, by rapid change of mechanical advantage, the low modulus or Bourdon tube effect of the tire structure, nor so close to horizontal as to require, for supporting the load with the links at that high position, a spreading force so great as to abruptly stop or excessively resist the cushioning movement upon the decrease of mechanical advantage of the load resulting from an excessively short relatively downward movement of the wheel member.

The brake drum of the wheel is shown at 28 and in the lower part of the assembly it may serve as a stop for the adjacent side ring against relatively upward movement of the latter, and an annular bracket 29 may be provided on the other side of the wheel body to serve in the same manner as a stop for the side ring which is at that side of the wheel.

A tubular shield or sleeve of flexible material, such as the sleeve 20c, surrounding the link and sealed at its ends to the felly and the side-ring, may be employed for preventing the escape of grease and the passage of dirt or grit into the bearing.

Fig. 3 illustrates a modified form of universal hinge-joint adapted for use in tire-mounting and other assemblies, the ball-end of the link being of full spherical form and a spherical ball-race surface and a set of bearing balls being provided at the back side as well as at the front side of the ball-end of the link, so that the link will have universal ball-bearing support under a compression load as well as under a tension load. Stops for the ball cage, such as the stops 27a, 27a, may be provided, to function at the ends of long swinging movements of the link, to prevent excessive progressive displacement of the balls from their proper angular relation to the bearing surfaces and to the ball-end of the link.

In the embodiment shown in Figs. 4 and 5 the construction is substantially the same as that of Figs. 1 and 2 except that the hinge-links, 20a, 20a, are formed with ball-ends 30, 30, here shown as completely spherical ball-ends, each of which bears directly upon the spherical bearing surface of a socket member 31 mounted in the side-ring structure or the wheel member, as the case may be, and the interior of each socket member has communication with a grease-gun fitting such as the fittings 32, 32, mounted in the structure as shown, for conveniently filling the socket with grease at what may be termed the rear side of the ball. Each socket 30 preferably is formed as two halves, meeting as shown at the line 31b, for ease of assembly with the other members.

In the embodiment shown in Fig. 6, the construction is substantially the same as that shown in the preceding figures except that the hinge-links, designated 20b, 20b, are of fiber or metal cable construction, and the bearing for each end of the link comprises a thimble 33 in which the end of the link is secured and which is supported against displacement near its inner end by a radial ball-bearing comprising balls 34, 34, and nearer its outer end by a ball thrust-bearing comprising the balls 35, 35, the outer ball-race of the radial bearing serving as a support against axial thrust for the thrust bearing, this arrangement being such that the thimble will be securely supported without excessive bearing strains and wear and will be rotated on its own fixed axis by the gyratory movement of the link so that the latter will be required to flex only in one direction and not be subjected to a gyratory flexing at its position of junction with the thimble member. At that position the thimble member preferably is formed with a radial notch or extension 36 of the axial aperture into which the link extends, the notch being formed with a curved wall of substantial radius against which the link bears in being flexed by the weight of the vehicle, so that the flexure of the link will not be excessively localized. Adjustment of the effective length of the link may conveniently be provided for by securing to the end thereof, as by brazing in the case of the metal cable shown, a rigid end-member such as the member 37 having a sliding fit in the bore of the thimble and bored and threaded at its outer end to receive an adjustment screw 38 provided with a washer 39 mounted under its head and bearing against the floor of a counter-sink 40 formed in the outer end of the thimble. The sockets 31a for the pairs of radial and thrust bearings may be formed integral respectively with the wheel member and the outer side-ring members as shown and cover plates such as the plates 41, 41 may be provided for retaining grease within the bearing sockets.

In the embodiment shown in Figs. 7 and 8, the link construction is very simple, the links being provided by a flexible cable 42 threaded back and forth, around the circumference of the wheel, through suitable apertures in the side-ring structures and the wheel member, set screws such as the screw 43 being threaded through a part of the wheel member and bearing against the cable to maintain the cable and wheel member in proper relation with the link portions of the cable on each side of the wheel member of equal length. A padding such as the felt padding 43a may be interposed between the set screw and the cable.

In this embodiment the means for holding the inner tube to crescent or U shape comprises a circumferential series of arch-shaped metal springs such as the spring 44, the springs being seated at their ends in circumferential notches formed in the inner side-ring members as shown.

Preferably each spring is of arcuate shape transversely of the assembly and of a length greater than 180° so that the tangential force of the spring at each end against the side-ring member, exerted by the pressure of the air within the tire, will have an inwardly directed component partially off-setting the outwardly-directed component of the tangential pull of the side-wall of the tire, so that the net amount of force urging the side-ring structures apart will not be so great as to hold the hinge-links too close to horizontal position under normal static load and unduly shorten the range of cushioning movement by abruptly stopping or excessively resisting the relative movement of the wheel member upon such slight increase of the inclination of the hinge-links, as in the case of the vehicle passing over an obstruction, as to decrease but slightly the mechanical advantage of the load against the spreading force of the air which urges the side-ring structures apart. For the same reason the springs preferably are tempered in such shape as not to exert any substantial spreading force upon the side-ring structures except possibly near the extreme limit of the movement of the ends of the spring toward each other.

Another advantage of having the springs 44 more than 180° in length is that it results in comparatively little increase and decrease of the circumferential length of the outer periphery of the spring assembly in the cushioning action of the device in service, and consequently avoids such movement of the outer portions of the springs from and toward each other and such consequent widening and narrowing of the small gaps between them as to chafe the spring-contacting member, which may be a shield 45 of rubber or rubberized fabric interposed between the inner tube and the assembly of springs. Each spring may be tapered in width from its middle to its ends, as shown in Fig. 8, to avoid excessive gaps between the outer, middle portions of the springs In this embodiment, with approximately the dimensions shown, the Bourdon tube effect is so pronounced, the crescent shaped space being comparatively narrow as the structure is viewed in cross-section, that the spreading force exerted upon the side-rings is but very slightly greater when the side-rings are drawn very close together by a heavy load than when they are permitted to stand in widely spaced-apart position by reason of the load being very light. This of course provides a long-range or low modulus cushioning movement and consequently highly effective cushioning action, as in fact is true of all of the illustrated embodiments in varying degree according to whether the structure is so proportioned as to provide a great or less great and but slightly varying inwardly directed component of the force of the air pressure to off-set to a corresponding extent a part of the outward and but slightly varying component of the force of the air pressure.

In the embodiment illustrated in Fig. 7 the inwardly-directed component of force increases approximately as rapidly as the outwardly directed component increases as the side rings move toward each other, so that the change in the net outward force is very small, the increase of the air pressure being very small because the shape of the air chamber is such that its volume is not greatly decreased by the drawing of the bead portions of the tire toward each other, and the directions of the tangential forces at the beads of the tire and at the ends of the springs being such that they both more closely approach the horizontal, so that the horizontal components of the two forces always vary in the same direction, with consequently slight variation in the net spreading force.

In all of these embodiments the side-rings are so connected to the felly of the wheel as to keep both the tire casing and the inner tube free from contact with the wheel or any part rigidly attached to the wheel, and the cushioning movement of the hinge links and side rings supplements locally the usual cushioning action of the tire without substantial impairment thereof. Thus the unsprung weight of the vehicle is substantially reduced as compared with that of constructions heretofore employed.

Since pulling together of the side rings is necessarily incident to any movement of them from their no-load positions concentric with the wheel, and such movement of the side rings toward each other makes the arc represented by any cross-section of the tire casing approximate more nearly a complete circle, the tire has a relatively large cross-sectional radius under light loads and a smaller cross-sectional radius when under heavy load, the air pressure slightly increasing automatically as the volume of the air cavity is reduced by the inward movement of the side-rings, and the radius of curvature of the side walls, which is a measure of the transverse strain in the tire, automatically decreasing so that the side wall is at a better advantage in withstanding such increase of air pressure as occurs.

Thus it is possible with this new mounting to use tires which under light loads will have some of the characteristics of tires of relatively greater cross sectional diameter, but containing less material than would formerly have been required for tires of comparable cross sectional diameter, and so to obtain increased riding comfort simply from the comparatively larger tires alone without a proportionate increase in the materials required for their construction, although the same tire, under heavier loading, will assume more nearly the size and shape of standard tires designed for the best side-wall action, with appropriate and automatic increase of the air pressure to correspond to the more sharply curved cross-sectional contour and the consequent increased ability of the carcass to withstand the higher pressure.

Another advantage in the method of tire mounting herein referred to is that, owing to the yielding connection between the two retaining rings, and between each of them and the felly, higher air pressures with their increased road efficiency may, if desired, be used in pneumatic tires supported on these tire mountings without such pressure resulting in disagreeably rough riding as in the case of rigid tire mountings.

Also, a pneumatic tire mounted on a tire mounting of this character provides a pneumatic cushioning effect against the sudden gripping of either the clutch or brakes, and such cushioning reduces the wear and tear not only on the tire itself but also on the mechanism propelling the vehicle.

While the geometry of the structure is such that the side rings may be of substantially rigid construction without excessive strain upon individual links or backing off of the ball-ends from the bearing balls in the braking or the accelerating action or in quick upward relative movement of the wheel member, the side rings may be of appropriate resilient deformability to provide for maintaining substantially uniform tension in all of the links at all times.

Further modifications are possible within the scope of the appended claims:

I claim:

1. A wheel and pneumatic tire assembly comprising a tire structure having its air chamber of bow-like shape in cross-section, a wheel member, and hinge-link members so connecting the wheel member with the sides of the tire structure that loading of the wheel member draws the cross-sectional end portions of the tire structure toward each other.

2. A wheel and tire assembly comprising substantially an annular flexible fluid-container of generally U-shape in cross-section, a wheel member, and hinge-link members having connection to the respective cross-sectional end portions of the container and with the wheel member for hammock-like support of the wheel member.

3. A wheel and tire assembly comprising a pneumatic tire having its air chamber of bow-like shape in cross-section, relatively stiff rings engaged with the respective sides of the tire, a wheel member, and two series of hinge-link members apart from the tire and having connection to the wheel member and respectively to the said rings.

4. A wheel and tire assembly comprising substantially an annular and flexible container adapted to be held distended by internal fluid pressure, means for so holding the inner periphery of the container that the container in shape is bow-like in cross-section, a wheel member, and hinge-link members having connection to the wheel member and to the sides of the container.

5. A wheel and tire assembly comprising substantially an annular and flexible container adapted to be held distended by internal fluid pressure, means for so holding the inner periphery of the said container that the container in shape is bow-like in cross-section, said means having the wall of the container flexible as its only immediate support, a wheel member, and hinge-link members interposed operatively between the wheel member and the portions of the container on opposite sides of the re-entrant portion.

6. A cushioning member comprising an elongate pneumatic structure having its air-chamber of bow-like shape in cross-section, and hammock-like means connecting the bow-end portions of the said structure.

7. A cushioning structure comprising a flexible container adapted to be held distended by internal fluid pressure, means for holding the container to substantially U shape in cross-section, and hammock-like means connecting the ends of the U.

8. A wheel and tire assembly comprising a pneumatic tire structure having its air-chamber of U shape in cross-section, the tire structure being bendable in cross-section in the manner of a bow, a wheel member, and hinge-like members so connecting the wheel members with the legs of the U that loading of the wheel member draws the cross-sectional end portions of the tire structure toward each other.

9. A wheel and tire assembly as defined in claim 8 in which the means for holding the air-chamber of the tire structure to U-shape in cross-section is a circumferential series of springs.

10. A wheel and tire assembly as defined in claim 8 in which the means for holding the air-chamber of the tire structure to U-shape in cross-section is a circumferential series of springs each of more than 180° in length.

11. A wheel and tire assembly as defined in claim 8 comprising a ring engaging the inner periphery of the tire structure to hold it with its air-chamber in U shape.

12. A wheel and tire assembly comprising a wheel structure, a pneumatic tire, relatively stiff side rings engaging opposite sides of the tire and adapted to produce deformation of the tire in moving toward each other and having portions extending inward on opposite sides of the inner periphery of the tire and of the outer margin of the wheel structure, and two circumferential series of link members symmetrically disposed with relation to the middle plane of the tire and connecting the wheel structure with the side rings respectively to movably support the wheel body by tension only, against the resistance of the tire to said deformation.

13. A wheel and tire assembly comprising a pneumatic tire structure, a wheel structure having its outer margin radially within and spaced from the middle zone of the inner periphery of the tire structure, and means symmetrically disposed with relation to the middle plane of the tire structure and wheel structure and hingedly connected to said tire structure and to said wheel structure for opposing to their relative movement the resistance of the tire structure to deformation.

DAVID M. GOODRICH.